United States Patent
Dey et al.

(10) Patent No.: US 11,606,432 B1
(45) Date of Patent: Mar. 14, 2023

(54) CLOUD DISTRIBUTED HYBRID DATA STORAGE AND NORMALIZATION

(71) Applicant: Accenture Global Solutions Limited, Dublin (IE)

(72) Inventors: Kuntal Dey, Birbhum (IN); Sankar Narayan Das, Barrackpore (IN); Vikrant Kaulgud, Pune (IN); Adam Patten Burden, Tampa, FL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/672,315

(22) Filed: Feb. 15, 2022

(51) Int. Cl.
 *H04L 67/1097* (2022.01)

(52) U.S. Cl.
 CPC .............................. *H04L 67/1097* (2013.01)

(58) Field of Classification Search
 CPC .................................................. H04L 67/1097
 See application file for complete search history.

(56) References Cited

U.S. PATENT DOCUMENTS

| | | | | |
|---|---|---|---|---|
| 8,667,080 | B2* | 3/2014 | Onorato | G06F 16/9574 709/217 |
| 8,825,887 | B2* | 9/2014 | Jennings | H04L 65/60 709/227 |
| 10,671,311 | B1* | 6/2020 | Chopra | H04L 67/1012 |
| 11,315,041 | B1* | 4/2022 | Jain | G06N 20/20 |
| 2008/0016196 | A1* | 1/2008 | MacMillan | H04L 67/125 709/223 |
| 2008/0256354 | A1* | 10/2008 | Blumenau | G06F 16/907 713/153 |
| 2010/0325422 | A1* | 12/2010 | Gnanasambandam | G06F 16/122 713/153 |
| 2010/0332592 | A1* | 12/2010 | Hamada | H04L 61/45 709/203 |
| 2013/0247134 | A1* | 9/2013 | Puttaswamy Naga | H04L 63/20 726/1 |
| 2013/0339390 | A1* | 12/2013 | Muller | G06F 16/22 707/782 |

(Continued)

FOREIGN PATENT DOCUMENTS

| | | | | |
|---|---|---|---|---|
| CN | 102999728 | A | * | 3/2013 |
| CN | 104598173 | A | * | 5/2015 ........... G06F 3/0643 |

(Continued)

*Primary Examiner* — Shean Tokuta
(74) *Attorney, Agent, or Firm* — Crowell & Moring, L.L.P.

(57) ABSTRACT

A method and system for cloud distributed hybrid data storage and normalization are disclosed. The method may include obtaining a data set comprising data entities. A data entity may comprise data fields each containing a data element. The method may further include determining policy constraint meta-data for each of the data elements based on the storage policy constraint. The policy constraint meta-data may include a first meta-tag indicating the storage policy constraint for the data element. The method may further include determining whether a server satisfies the storage policy constraint based on the first meta-tag for the data element. When the server satisfies the storage policy constraint, the method may further include transmitting the data element to the server to store the data element on the server. When the server fails to satisfy the storage policy constraint, the method may further include, storing the data element on the client.

13 Claims, 5 Drawing Sheets

(56) References Cited

U.S. PATENT DOCUMENTS

| | | | | |
|---|---|---|---|---|
| 2014/0012887 A1* | 1/2014 | Tamano | ................ | G06F 16/182 |
| | | | | 707/827 |
| 2015/0294002 A1* | 10/2015 | Corbett | .............. | G06F 16/2453 |
| | | | | 707/765 |
| 2017/0331880 A1* | 11/2017 | Crofton | ................. | G06F 16/182 |
| 2018/0053012 A1* | 2/2018 | Myers | ................ | G06F 12/1408 |
| 2018/0121101 A1* | 5/2018 | Thind | .................... | G06F 3/067 |
| 2019/0250839 A1* | 8/2019 | Bedadala | ............. | G06F 3/0605 |
| 2019/0250998 A1* | 8/2019 | Bedadala | ........... | G06F 11/1464 |
| 2020/0175197 A1* | 6/2020 | Myers | .................... | G06F 3/067 |
| 2020/0311035 A1* | 10/2020 | Chung | ................. | G06F 16/182 |
| 2020/0401719 A1* | 12/2020 | Denker | .............. | G06F 21/6227 |
| 2020/0412806 A1* | 12/2020 | Largman | .............. | H04L 51/222 |

FOREIGN PATENT DOCUMENTS

| | | | | |
|---|---|---|---|---|
| CN | 109067868 A | * | 12/2018 | |
| CN | 109951480 A | * | 6/2019 | ........... G06F 21/602 |
| CN | 111045606 A | * | 4/2020 | ........... G06F 3/0607 |
| CN | 109739816 B | * | 6/2020 | |
| CN | 111913919 A | * | 11/2020 | |
| CN | 107315786 B | * | 12/2020 | ............ G06F 16/211 |
| JP | 2006065570 A | * | 3/2006 | ......... G06F 21/6218 |
| JP | 2014515521 A | * | 6/2014 | |
| WO | WO-2016134466 A1 | * | 9/2016 | ......... G06F 12/1408 |
| WO | WO-2018211290 A1 | * | 11/2018 | ....... G06F 16/24564 |

\* cited by examiner

CLOUD DISTRIBUTED HYBRID DATA STORAGE AND NORMALIZATION

TECHNICAL FIELD

This disclosure relates to data protection, in particular, to cloud distributed hybrid data storage and normalization.

BACKGROUND

The data storage and execution systems today store independent data sets either on-premise or on the cloud, and perform business operations accordingly. For example, in a conventional storage arrangement, a client serving multiple end users can store uniformly at a per-data-set level, that is, a data set is stored in the on-premise client or in a remote server such as a cloud. As a result, the data in the data set is retrieved and processed either fully at the client or fully at the server. However, it is desirable to take advantage of the benefits of local data storage and remote data storage.

SUMMARY

This disclosure relates to systems and methods for hybrid data storage and normalization.

In one embodiment, a method for hybrid data storage and normalization is disclosed. The method may be performed by a processor circuitry on a client. The method may include obtaining a data set comprising a plurality of data entities subject to a policy constraint. A data entity of the plurality of data entities may include a plurality of data fields each containing a data element. A data field of the plurality of data fields may represent an attribute of the data entity. The data element may represent a value of the attribute, and the policy constraint may include a storage policy constraint applied to data elements of the plurality of data fields. The method may further include determining policy constraint meta-data for each of the data elements based on the storage policy constraint. The policy constraint meta-data may include a first meta-tag indicating the storage policy constraint for the data element. The method may further include determining whether a server satisfies the storage policy constraint based on the first meta-tag for the data element. The client may be communicatively connected to the server. The method may further include, in response to the server satisfying the storage policy constraint for the data element, transmitting the data element to the server to store the data element on the server. The method may further include, in response to the server failing to satisfy the storage policy constraint for the data element, storing the data element on the client.

In another embodiment, a method for hybrid data retrieval is disclosed. The method may be performed by a processor circuitry on a client. The method may include receiving a data query for a data entity. The data entity may include a plurality of data fields each containing a data element. A data field of the plurality of data fields may represent an attribute of the data entity. The data element may represent a value of the attribute. At least one of the data elements of the plurality of data fields may be stored on the client and at least one of the data elements of the plurality of data fields may be stored on a server. The client may be communicatively connected to the server. The method may further include retrieving policy constraint meta-data for each of the data elements in the data entity. The policy constraint meta-data may be generated based on a policy constraint applied to the data elements. The method may further include, for each of the data elements, determining whether the data element is stored on the client or the server based on the policy constraint meta-data. The method may further include, in response to the data element being stored on the client, retrieving the data element from the client. The method may further include, in response to the data element being stored on the server, transmitting a retrieval request for the data element to the server. The method may further include receiving the data element retrieved from the server and aggregating the data element retrieved from the client and the data element retrieved from the server as a result of the data query.

In another embodiment, a method for hybrid data retrieval is disclosed. The method may be performed by a processor circuitry on a server. The method may include receiving a data query for a data entity. The data entity may include a plurality of data fields each containing a data element. A data field of the plurality of data fields may represent an attribute of the data entity. The data element may represent a value of the attribute. At least one of the data elements of the plurality of data fields may be stored on a client and at least one of the data elements of the plurality of data fields may be stored on the server. The client may be communicatively connected to the server. The method may further include retrieving policy constraint meta-data for each of the data elements in the data entity. The policy constraint meta-data may be generated based on a policy constraint applied to the data elements. The policy constraint may include a storage policy constraint. The method may further include, for each of the data elements, determining whether the data element is stored on the client or the server based on the policy constraint meta-data indicating the storage policy constraint. The method may further include, in response to the data element being stored on the server, retrieving the data element from the server. The method may further include, in response to the data element being stored on the client, generating a retrieval request for the data element based on the policy constraint meta-data of the data element. The method may further include transmitting the retrieval request for the data element to the client, receiving the data element retrieved from the client, and aggregating the data element retrieved from the client and the data element retrieved from the server as a result of the data query.

In another embodiment, a system for hybrid data storage and normalization is disclosed. The system may include a memory having stored thereon executable instructions and a processor in communication with the memory. When executing the instructions, the processor may be configured to obtain a data entity subject to a policy constraint. The data entity may include a plurality of data fields each containing a data element. A data field of the plurality of data fields may represent an attribute of the data entity. The data element may represent a value of the attribute and the policy constraint may include a storage policy constraint applied to data elements of the plurality of data fields. The processor may be further configured to determine policy constraint meta-data for each of the data elements based on the storage policy constraint. The policy constraint meta-data may include a meta-tag indicating the storage policy constraint for the data element. The processor may be further configured to determine whether a server satisfies the storage policy constraint based on the meta-tag for the data element. The client may be communicatively connected to the server. The processor may be further configured to, in response to the server satisfying the storage policy constraint for the data element, transmit the data element to the server to store the data element on the server. The processor may be further configured to, in response to the server failing to satisfy the storage policy constraint for the data element, store the data element on the client.

In another embodiment, a product for hybrid data storage and normalization is disclosed. The product may include machine-readable media other than a transitory signal and instructions stored on the machine-readable media. When being executed, the instructions may be configured to cause a processor on a client to obtain a data entity subject to a policy constraint. The data entity may include a plurality of data fields each containing a data element. A data field of the plurality of data fields may represent an attribute of the data entity. The data element may represent a value of the attribute and the policy constraint may include a storage policy constraint applied to data elements of the plurality of data fields. The instructions may be configured to cause the processor to determine policy constraint meta-data for each of the data elements based on the storage policy constraint. The policy constraint meta-data may include a meta-tag indicating the storage policy constraint for the data element. The instructions may be configured to cause the processor to determine whether a server satisfies the storage policy constraint based on the meta-tag for the data element. The client may be communicatively connected to the server. The instructions may be configured to cause the processor to, in response to the server failing to satisfy the storage policy constraint for the data element, store the data element on the client. The instructions may be configured to cause the processor to, in response to the server satisfying the storage policy constraint for the data element, transmit the data element to the server to store the data element on the server.

One interesting feature of the hybrid data storage and normalization systems and methods described below may be that a data set may be implemented with custom policies in terms of data sharing, storage and processing privacy policies required by the end users or the governmental regulations, such as General Data Protection Regulation (GDPR). For example, the methods and systems may customize privacy policies up to a per-data-element level for each data entity in the data set. Data elements of a data entity may be stored in a hybrid manner as per the privacy policies. For example, some data elements of the data entity are stored on the client and the other data elements of the same data entity are stored on the server as per the privacy policies. Additionally, in the hybrid data storage and normalization systems and methods, the server may provide processing resources and services to the client, for example, by generating and transmitting executable logics to the client such that the client may directly utilize the executables to perform operations. As such, the client may only need to maintain limited processing resources and services. Accordingly, the hybrid data storage and normalization systems and methods may satisfy the storage and execution policy constraints required by end users or governmental regulation in a manner of maximizing the server infrastructure utilization and borrowing from the client storage and processing capabilities to the minimal extent.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

A data set may represent a collection of data as a whole, which may include a plurality of data entities. Each of the data entities may include a plurality of data fields. Each of the fields may contain a data element. A data field may represent an attribute of the data entity while the data element may represent a value of the attribute. For example, in the case of tabular data, a data set corresponds to one or more database tables, where every column of a table represents a particular variable, and each row corresponds to a given record of the data set. The row in the table may be referred to as the data entity. The variable may be referred to as the data field. The data set lists value of each of the variables, which may be referred to as the data element, for each data entity of the data set.

In the existing data storage and processing technique for client-server distributed model, a data set is either stored on the client or on the server, and the data is processed either fully at the client or fully at the server. As a result, a data set may not be implemented with custom policies for individual data elements in terms of data sharing, storage and processing such as privacy policies required by the end users or the governmental regulations such as GDPR. To implement the custom policies, the present disclosure will discuss hybrid data storage and normalization methods and systems, which may for example customize privacy policies up to a per-data-element level for each data entity in the data set. With the methods and systems in the present disclosure, the data elements in a data entity can be stored at different storage locations in a hybrid way as per storage and execution policy constraints required by end users or governmental regulation, thereby improving data security.

Figure 1:
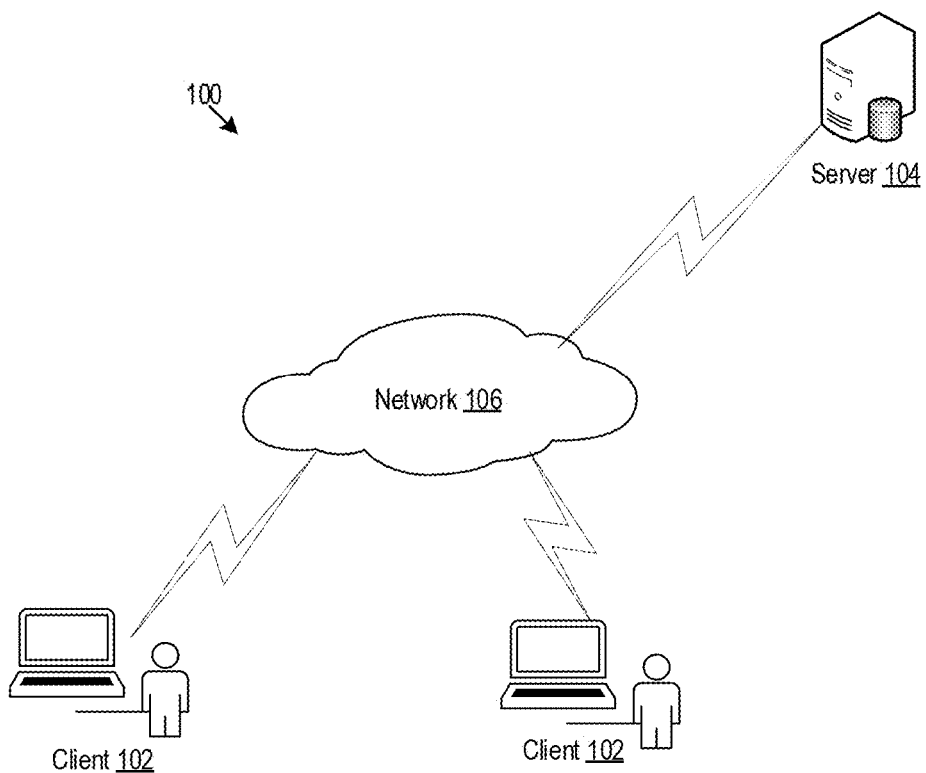
FIG. 1 shows an exemplary system for hybrid data storage and normalization.

FIG. 1 shows exemplary system 100 for hybrid data storage and normalization. In this example, the system 100 may include one or more clients 102 and a server 104.

The client 102 is communicatively connected to the server 104 via the network 106. In the system 100, the server 104 may host, deliver, and manage the resources and backend services to be consumed by the client 102. The server 104 may be one server, a server cluster including several servers, or a cloud computing center. The client 102 may have limited data storage and processing capability and request and receive service from the server 104. The client 102 may serve as a middle tier to provide services to end users. For example, the client 102 may be located in a hospital to serve patients by collecting their data for health monitoring while they are in the hospital or after they have been discharged. The client 102 may store the patient data either locally or on the server 104.

The network 106 may make use of a standard communication technology and/or protocol. For example, the network 106 may be the Internet, but may alternatively be any other applicable network such as a local area network (LAN), a metropolitan area network (MAN), and a wide area network (WAN). The network 106 may be a wired network, a wireless network, a dedicated network, or a virtual dedicated network. In some implementations, technologies and/or formats such as the HyperText Markup Language (HTML) and the extensible markup language (XML) may be used to represent data exchanged through the network. In addition, some or all links via the network 106 may be encrypted using encryption technologies such as a secure socket layer (SSL), transport layer security (TLS), a virtual private network (VPN), and internet protocol security (IPsec). Additionally or alternatively, custom and/or dedicated data communication technologies may also be used in place of or in addition to the foregoing data communication technologies.

Figure 2:
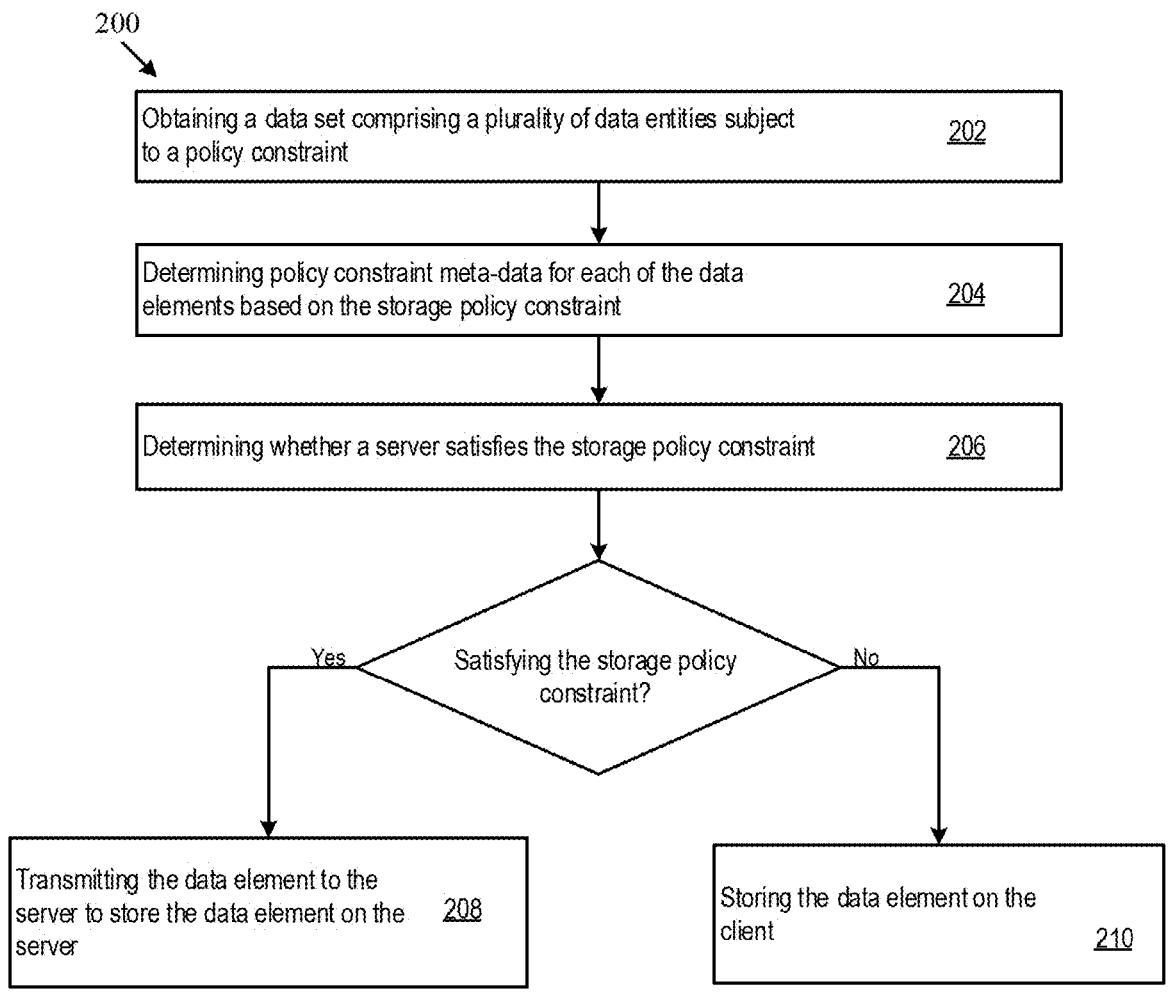
FIG. 2 shows an exemplary hybrid data storage and normalization logic.

FIG. 2 shows an exemplary hybrid data storage and normalization logic (HDSL) 200. The logical features of the HDSL 200 may be implemented in various orders and combinations. For example, in a first implementation, one or more features may be omitted or reordered with respect to a second implementation. The logical features will be discussed with reference to FIG. 1.

The client 102 may obtain a data set comprising a plurality of data entities subject to a policy constraint (202). In an implementation, the client 102 may receive the data set from the end users, for example, via a graphical user interface (GUI). In another implementation, the client 102 may obtain the data set from a remote third-party database.

A data entity of the plurality of data entities may include a plurality of data fields. Each of the data fields may contain a data element. The policy constraint may include a storage policy constraint applied to data elements of the plurality of data fields. For example, the storage policy constraint may indicate that the data element A is non-sharable while indicating that the data element B is sharable subject to encryption. If a data element is non-sharable, the data element may have to be stored locally. If a data element is sharable subject to encryption, the data element is required to be stored in encryption.

Additionally or alternatively, the policy constraint may include an execution policy constraint applied to data elements of the plurality of data fields. The execution policy constraint may, for example, indicate that a data element will be shared only subject to processing attributes. In an example, the data element is required to be processed in an encrypted execution environment. In another example, the data element is required to be processed in a trusted execution environment (TEE). The policy constraint may be customized by the end users for their own data entities in the data set respectively. Additionally or alternatively, the policy constraint may be predefined and stored locally on the client 102.

The client 102 may determine policy constraint meta-data for each of the data elements based on the storage policy constraint (204). The policy constraint meta-data may include a first meta-tag indicating the storage policy constraint for the data element. In an implementation, the client 102 may generate the policy constraint meta-data for each of the data elements based on the storage policy constraint. For example, where a storage constraint on a data element is non-sharable, the client 102 may generate the meta-tag <private>, or another desired meta-tag, to mark the data element as non-sharable in the data set. Where a storage constraint on a data element is sharable only subject to encryption, the client 102 may generate the meta-tags <encrypted> and <uploadable>, or other desired meta-tags, to indicate the storage constraint.

In another implementation, where a plurality of data entities in the data set are subject to the same policy constraint, for example, for each of the data fields in the plurality data entities, the data elements of different data entities in the same data field are subject to the same storage policy constraint, the client 102 may generate a single set of policy constraint meta-data common to the plurality of data entities based on the same policy constraint. Then, the client 102 may add the common policy constraint meta-data to a storage reference catalogue as a storage reference catalogue entry. For each of the plurality of data entities, the client 102 may set a reference, such as an address pointer, to the storage reference catalogue entry to indicate the common policy constraint meta-data for each of the data elements in the data entity.

In this way, the client 102 does not have to repeatedly generate identical policy constraint meta-data for the data entities subject to the same policy constraint, thereby saving storage space. In an example, to determine policy constraint meta-data for each of the data elements in a data entity, the client 102 may search storage reference catalogue for the storage reference catalogue entry corresponding to the same policy constraint as that applied to the data elements in the data entity. If the client 102 finds the storage reference catalogue entry, the client 102 may simply set a reference to the storage reference catalogue entry to indicate the policy constraint meta-data for each of the data elements in the data entity.

Upon determining the policy constraint meta-data, the client 102 may determine whether the server 104 satisfies the storage policy constraint based on the meta-tag in the policy constraint meta-data (206). For example, where the meta-tag for the data element is <private>, which indicates that the data element is non-sharable, the client 102 may determine that the server 104 does not satisfy the storage policy constraint of the data element. For another example, where the meta-tag for the data element is <encrypted> which indicates that the data element needs to be stored in encryption, the client 102 may transmit a request to the server 104 to inquiry storage types supported by the server 104. If the server 104 supports encryption storage, the client 102 may determine that the server 104 satisfies the storage policy constraint of the data element.

Where the client 102 determines that the server 104 satisfies the storage policy constraint for the data element, the client 102 may transmit the data element to the server to store the data element on the server 104 (208). To index the data element stored on the server 104, the client 102 may generate identification information such as a unique identifier (UID) for the data entity and transmit the UID to the server 104 to store the UID together with the data element of the data entity. In some implementations, where a data element is stored on the server 104, the client 102 may generate a meta-tag, such as <uploaded>, indicating storage of the data element on the server for the data element and store the meta-tag on the client 102.

Where the client 102 determines that the server fails to satisfy the storage policy constraint for the data element, the client 102 may directly store the data element on the client 102 (210). In some implementations, where a data element is stored on the client 102, the client 102 may generate a meta-tag, such as <at_client>, indicating storage of the data element on the client 102 for the data element and transmit the meta-tag to the server 104 to store the meta-tag on the server 104. In this way, the server 104 may readily determine which data elements in the date entity are stored on the client 102 in lieu of the server 104.

Moreover, the client 102 may take the execution policy constraint into account in determining to store a data element on the client 102 or the server 104. In particular, the client 102 may determine the policy constraint meta-data for each of the data elements in a data entity further based on the execution policy constraint. The policy constraint meta-data may further include a second meta-tag indicating the execution policy constraint for the data element.

In an implementation, the client 102 may generate the policy constraint meta-data for each of the data elements based on the execution policy constraint. For example, where an execution constraint on a data element requires the data element to be processed in an encrypted execution environment on a server, the client 102 may generate the meta-tag <encrypted-processing-only-at-server> for the data element. Where a storage constraint on a data element requires the data element to be processed in a trusted execution environment on a server, the client 102 may generate the meta-tag <TEE-based-processing-only-at-server> for the data element.

In another implementation, the client 102 may search storage reference catalogue for the storage reference catalogue entry corresponding to the same execution policy constraint as that applied to the data elements in the data entity. If the client 102 finds the storage reference catalogue entry, the client 102 may set a reference to the storage reference catalogue entry to indicate the policy constraint meta-data for each of the data elements in the data entity.

Upon determining the policy constraint meta-data including the second meta-tag indicating the execution policy constraint for the data element, the client 102 may determine whether the server 104 satisfies the execution policy constraint based on the second meta-tag for the data element. For example, where the second meta-tag for the data element is <encrypted-processing-only-at-server> which indicates that the data element is required to be processed on a server providing encrypted execution environment, the client 102 may transmit a request to the server 104 to inquiry processing types supported by the server 104. If the server 104 supports encrypted execution environment, the client 102 may determine that the server 104 satisfies the execution policy constraint of the data element. Accordingly, when determining that the server 104 satisfies the storage policy constraint and the execution policy constraint, the client 102 may transmit the data element to the server 104 to store the data element on the server 104. Otherwise, the client 102 may directly store the data element locally on the client 102.

Herein, the generation of policy constraint meta-data enables the end users to indicate sharing, storage and processing policies at a per-data-entity basis. Accordingly, as per the policy constraint meta-data, the data elements in the same data entity may be stored in a hybrid way. For example, some data elements of the data entity may be stored on the client while the other data elements of the data entity may be stored on the server. In this way, the storage space on the client may be saved without sacrificing the privacy policy of the end users or violating the governmental regulations on privacy.

The following is an example of a real world implementation of the method disclosed above. End users had signed up with a telecommunication provider in 2020 and earlier had given permission to share their outgoing and incoming call cell tower identifiers and phone numbers in their call detail records (CDRs) to the telecommunication provider, but not to share service set identifiers (SSIDs). The sharing is subject to the TEE. For example, to share the outgoing and incoming call cell tower identifiers and phone numbers with a server, the server is required to support TEE. The telecommunication provider modified its end-customer agreement on Jan. 1, 2021. As a result, the end users that signed up for the telecommunication provider after Jan. 1, 2021 have permitted the telecommunication provider to share their outgoing and incoming call cell tower identifiers in their CDRs, but not to share phone numbers and SSIDs. The sharing is subject to TEE or homomorphic encryption. For example, to share the outgoing and incoming call cell tower identifiers with a server, the server has to support TEE or homomorphic encryption.

In this example, the end users Kuntal and Vikrant signed up for the telecommunication provider in December 2020, while the end users Sankar and Jhilam signed up in January 2021. Now, there are three call records between the end users: (a) Kuntal calls Vikrant, (b) Kuntal calls Sankar, and (c) Jhilam calls Sankar. The three call records constitute three data entities. By performing the HDSL 200 at the client 102, the data elements of the three data entities and their corresponding policy constraint meta-data may be stored on the client 102 and the server 104 in a hybrid way with data elements distributed across the two storage locations. Table 1 shows the storage of some data elements of the data entities and some policy constraint meta-data of the data entities on the client 102. Table 2 shows the storage of the other data elements of the data entities and the other policy constraint meta-data of the data entities on the server 104.

TABLE 1

Storage of the data entities on client

| Scenario | Caller | Callee | SSID_Caller | SSID_Callee | CellTower_Caller | CellTower_Callee | U_ID |
|---|---|---|---|---|---|---|---|
| Kuntal calls Vikrant | <process_TEE>, <uploaded> | <process_TEE>, <uploaded> | Kuntal's SSID value, <private> | Vikrant's SSID value, <private> | <process_TEE>, <uploaded> | <process_TEE>, <uploaded> | #1 |
| Kuntal calls Sankar | <process_TEE>, <uploaded> | Sankar's phone no., <private> | Kuntal's SSID value, <private> | Sankar's SSID value, <private> | <process_TEE>, <uploaded> | <process_TEE_HE>, <uploaded> | #2 |
| Jhilam calls Sankar | Jhilam's phone no., <private> | Sankar's phone no., <private> | Jhilam's SSID value, <private> | Sankar's SSID value, <private> | <process_TEE_HE>, <uploaded> | <process_TEE_HE>, <uploaded> | #3 |

TABLE 2

Storage of the data entities on server

| Scenario | Caller | Callee | SSID_Caller | SSID_Callee | CellTower_Caller | CellTower_Callee | U_ID |
|---|---|---|---|---|---|---|---|
| Kuntal calls Vikrant | Kuntal's phone no. | Vikrant's phone no. | <at_client> | <at_client> | Kuntal's cell tower ID | Vikrant's cell tower ID | #1 |
| Kuntal calls Sankar | Kuntal's phone no. | <at_client> | <at_client> | <at_client> | Kuntal's cell tower ID | Sankar's cell tower ID | #2 |
| Jhilam calls Sankar | <at_client> | <at_client> | <at_client> | <at_client> | Jhilam's cell tower ID | Sankar's cell tower ID | #3 |

Figure 3:
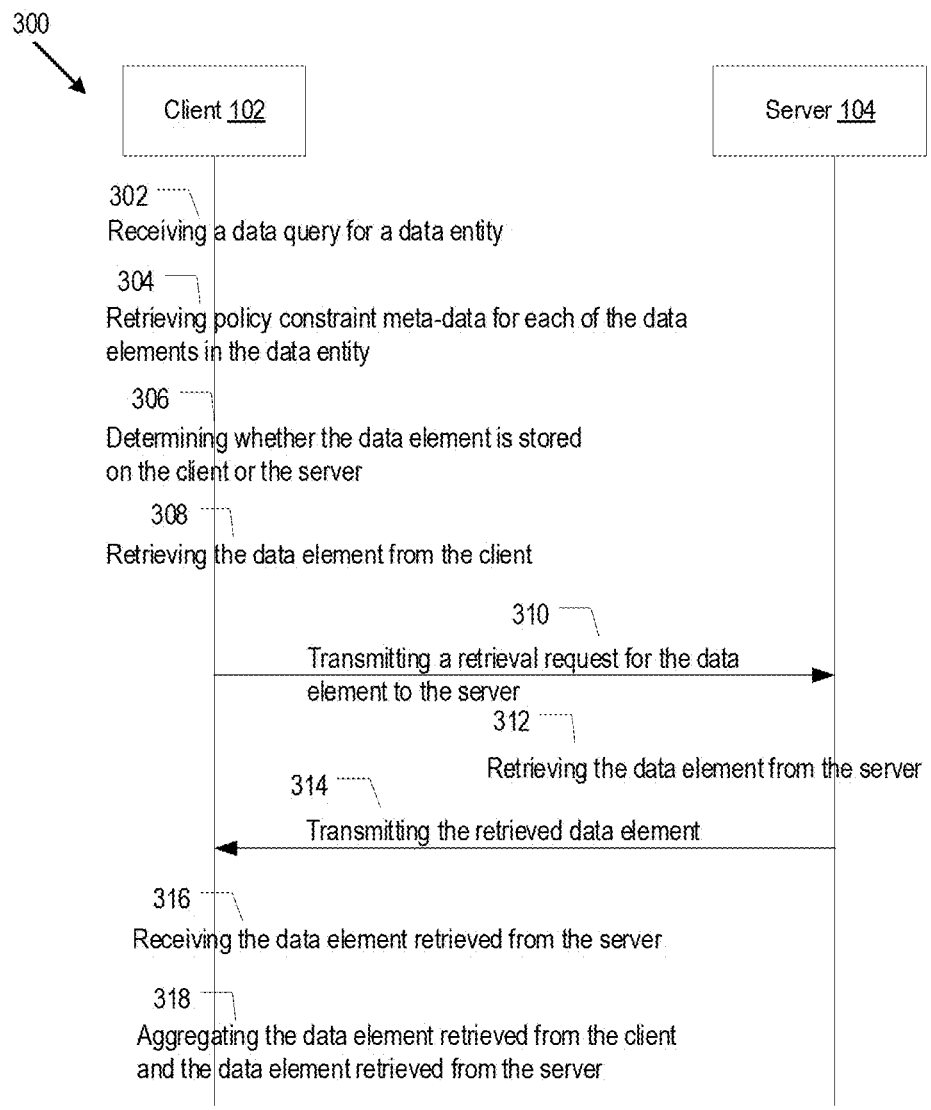
FIG. 3 shows an exemplary hybrid data retrieval logic performed on a client.

FIG. 3 shows an exemplary hybrid data retrieval logic (CHDRL) 300 performed at the client. The logical features of the CHDRL 300 may be implemented in various orders and combinations. For example, in a first implementation, one or more features may be omitted or reordered with respect to a second implementation. The logical features of the CHDRL 300 will be discussed with reference to FIG. 1.

The client 102 may receive a data query for a data entity (302). The data entity may include a plurality of data fields. Each of the data fields may contain a data element. A data field may represent an attribute of the data entity and a data element may represent a value of the attribute. Some data elements of the data entity are stored on the client 102 while the other data elements of the data entity are stored on the server 104.

Upon receiving the data query, the client 102 may retrieve policy constraint meta-data for each of the data elements in the data entity (304). The policy constraint meta-data may be generated based on a policy constraint applied to the data elements as discussed above in the context of the HDSL 200. The policy constraint may include a storage policy constraint and an execution policy constraint. Accordingly, the policy constraint meta-data may be generate based on the storage policy constraint and the execution policy constraint.

In an example, the policy constraint meta-data may be stored as an independent data record in a database of the client 102. As such, the client 102 may retrieve the data record from the database. In another example, if the data entity has a reference to a storage reference catalogue entry in the storage reference catalogue, the client 102 may read the policy constraint meta-data from the storage reference catalogue entry.

For each of the data elements of the data entity, the client 102 may determine whether the data element is stored on the client or the server based on the policy constraint meta-data for the data element (306). Take the data record of "Kuntal calls Vikrant" in Table 1 as example, based on the meta-tag <uploaded> of the meta-data in the data fields "Caller," "Callee," "CellTower_Caller," and "CellTower_Callee," the client 102 may determine that the data elements for the four data fields are stored on the server 104. Based on the meta-tag <private> of the meta-data in the data fields "SSID_Caller" and "SSID_Callee," the client 102 may determine that the data elements for the two data fields are stored on the client 102.

When determining the data element is stored on the client 102, the client 102 may retrieve the data element from the client (308). For example, the client 102 may retrieve the data element for the data fields "SSID_Caller" and "SSID_Callee," i.e., "Kuntal's SSID value" and "Vikrant's SSID value" from the Table 1. In an implementation, the policy constraint meta-data for the data element may include meta-tag indicating the execution policy constraint for the data element. The client 102 may determine a specific execution environment based on the meta-tag and retrieve the data element from the client 102 in the specific execution environment. For example, the meta-data for the data element includes a meta-tag <process_HE> indicating that the data element is required to be processed in a homomorphic encryption environment. Accordingly, the client 102 may execute the retrieval operation on the data element in a homomorphic encryption environment.

When determining the data element is stored on the server 104, the client 102 may transmit a retrieval request for the data element to the server 104 via the network 106 (310). For example, the client 102 may transmit a retrieval request for the data elements for the data fields "Caller," "Callee," "CellTower_Caller," and "CellTower_Callee" of the data record "Kuntal calls Vikrant." Upon receiving the retrieval request, the server 104 may retrieve the data element for the data fields, i.e., "Kuntal's phone number," "Vikrant's phone number," "Kuntal's cell tower ID" and "Vikrant's cell tower ID" from the Table 2 (312), and then transmit the retrieved data elements to the client 102 (314). Subsequently, the client 102 may receive the retrieved data elements from the server (316) and aggregate the data elements from the client 102 and the data elements retrieved from the server 104 as a result of the data query as shown in Table 3 (318).

TABLE 3

Result of data query by the Client

| Scenario | Caller | Callee | SSID_Caller | SSID_Callee | CellTower_Caller | CellTower_Callee |
|---|---|---|---|---|---|---|
| Kuntal calls Vikrant | Kuntal's phone no. | Vikrant's phone no. | Kuntal's SSID value | Vikrant's SSID value | Kuntal's cell tower ID | Vikrant's cell tower ID |

Figure 4:
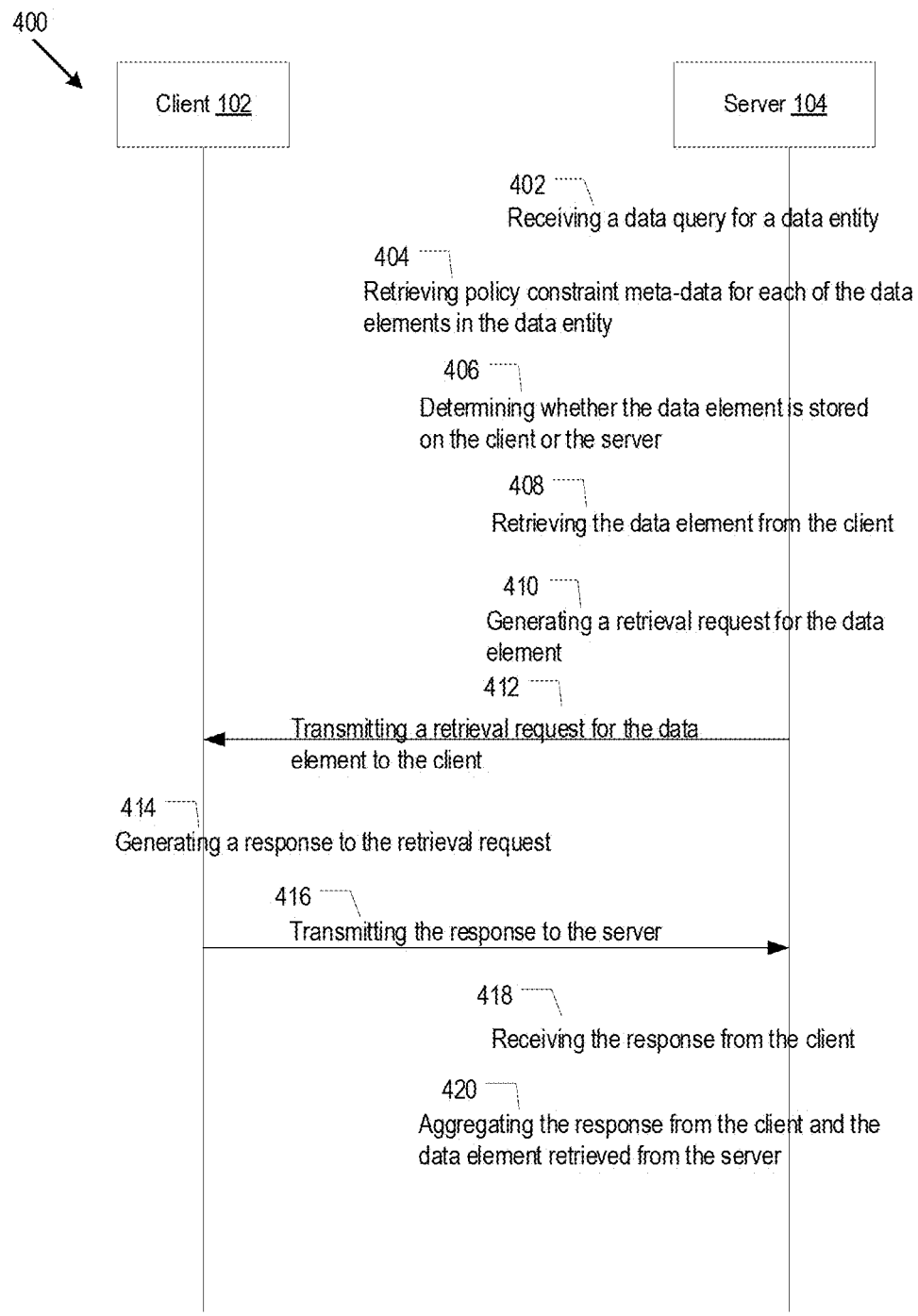
FIG. 4 shows an exemplary hybrid data retrieval logic performed on a server.

FIG. 4 shows an exemplary hybrid data retrieval logic (SHDRL) 400 performed at the server. The logical features of the SHDRL 400 may be implemented in various orders and combinations. For example, in a first implementation, one or more features may be omitted or reordered with respect to a second implementation. The logical features of the SHDRL 400 will be discussed with reference to FIG. 1.

The server 104 may receive a data query for a data entity (402). The data entity may include a plurality of data fields. Each of the data fields may contain a data element. A data field may represent an attribute of the data entity and a data element may represent a value of the attribute. Some data elements of the data entity are stored on the client 102 while the other data elements of the data entity are stored on the server 104.

Upon receiving the data query, the server 104 may retrieve policy constraint meta-data for each of the data elements in the data entity (404). The policy constraint meta-data may be generated based on a policy constraint applied to the data elements as discussed above in the context of the HDSL 200. The policy constraint may include a storage policy constraint and an execution policy constraint. Accordingly, the policy constraint meta-data may be generate based on the storage policy constraint and the execution policy constraint.

In an example, the policy constraint meta-data may be stored as an independent data record in a database of the server 104. As such, the server 102 may retrieve the data record from the database. In another example, the data entity has a reference to a storage reference catalogue entry in the storage reference catalogue, the server 102 may read the policy constraint meta-data from the storage reference catalogue entry.

For each of the data elements of the data entity, the server 104 may determine whether the data element is stored on the client or the server based on the policy constraint meta-data for the data element (406). Take the data record of "Kuntal calls Vikrant" in Table 2 as example, based on the meta-tag <at_client> of the meta-data in the data fields "SSID_Caller" and "SSID_Callee," the server 104 may determine that the data elements for the two data fields are stored on the client 102.

When determining the data element is stored on the server 104, the server 104 may retrieve the data element from the server (408). For example, the server 104 may retrieve the data elements for the data fields "Caller," "Callee," "CellTower_Caller," and "CellTower_Callee" of the data record "Kuntal calls Vikrant." i.e., "Kuntal's phone number," "Vikrant's phone number," "Kuntal's cell tower ID" and "Vikrant's cell tower ID" from the Table 2.

In an implementation, the policy constraint meta-data for the data element may include meta-tag indicating the execution policy constraint for the data element. The server 104 may determine a specific execution environment based on the meta-tag and retrieve the data element from the server 104 in the specific execution environment. For example, the meta-data for the data element includes a meta-tag <process_TEE> indicating that the data element is required to be processed in a trusted execution environment. Accordingly, the server may execute the retrieval operation on the data element in a trusted execution environment.

When determining the data element is stored on the client 102, the server 104 may generate a retrieval request for the data element based on the policy constraint meta-data of the data element (410) and transmit the retrieval request for the data element to the client 102 via the network 106 (412). The retrieval request may include, for example, identification information of the data entity including the data element to be retrieved. For example, to retrieve the data elements for the data fields "SSID_Caller" and "SSID_Callee" of the data record "Kuntal calls Vikrant," the retrieval request may include the "U_ID" of the data record, i.e., #1.

In an implementation, to minimize the processing resources and services that need to be maintained on the client side, the server may provide the executable logic for the client directly to execute the executable logic to retrieve the requested data element from the client. The server 104 may maintain processing codes in form of executables and processing components in form of library. Based on the policy constraint meta-data of the data element, the server 104 may determine the executable logic to be generated for the retrieval of the data element. For example, where the policy constraint meta-data of the data element indicates that the data element is sharable with the server, the server 104 may compile processing codes to generate an executable logic simply retrieving the data element from the client. Where the policy constraint meta-data of the data element indicates that the data element is limitedly sharable with the server, the server 104 may compile processing codes to generate an executable logic generating relevant information of the data element such as statistical or descriptive information in lieu of retrieving the data element itself. Then, the server 104 may add the generated executable logic to the retrieval request.

Upon receiving the retrieval request from the server 104, the client 102 may generate a response to the retrieval request based on the policy constraint meta-data for the data element (414) and transmit the response to the server 104 (416). In an example, where the policy constraint meta-data indicates that the data element is non-sharable with the server 104, the client 102 may generate a NULL value as the response to the retrieval request. Where the policy constraint meta-data indicates that the data element is limitedly sharable with the server, the client 102 may generate relevant information of the data element such as statistical or descriptive information as the response to the retrieval request. In an implementation, the retrieval request may include an executable logic generated by the server 104 for generating the relevant information of the data element. The client 102 may directly execute the executable logic to obtain the relevant information of the data element.

Where the policy constraint meta-data indicates that the data element is sharable with the server 104, the client 102 may retrieve the data element from the client 102 as the response to the retrieval request. In an implementation, the retrieval request may include identification information of the data entity. The client 102 may retrieve the data element from the client 102 based on the identification information of the date entity. In another implementation, the retrieval request may include an executable logic generated by the server 104 for retrieving the data element from the client. The client 102 may thus directly execute the executable logic to obtain the data element, for example, from the storage of the client 102. Additionally, where the policy constraint meta-data for the data element includes meta-tag indicating the execution policy constraint, the client 102 may determine an execution environment for the executable logic based on the meta-tag and execute the executable logic in the execution environment to retrieve the data element from the client 102. For example, the meta-tag is <process_TEE> indicating that the data element is required to be processed in a trusted execution environment. The client 102 may execute the executable in a trusted execution environment.

Referring to FIG. 4, upon receive the response from the client 102 (418), the server 104 may aggregate the response from the client 102 and the data element retrieved from the server as a result of the data query (420). For example, Table 4 shows a result of the data query, in which the data elements of the data fields "SSID_Caller" and "SSID_Callee" are non-sharable with the server 104, and thus the response to the retrieval request for the data elements is NULL value.

TABLE 4

Result of data query by the server

| Scenario | Caller | Callee | SSID_Caller | SSID_Callee | CellTower_Caller | CellTower_Callee |
|---|---|---|---|---|---|---|
| Kuntal calls Vikrant | Kuntal's phone no. | Vikrant's phone no. | NULL | NULL | Kuntal's cell tower ID | Vikrant's cell tower ID |

Figure 5:
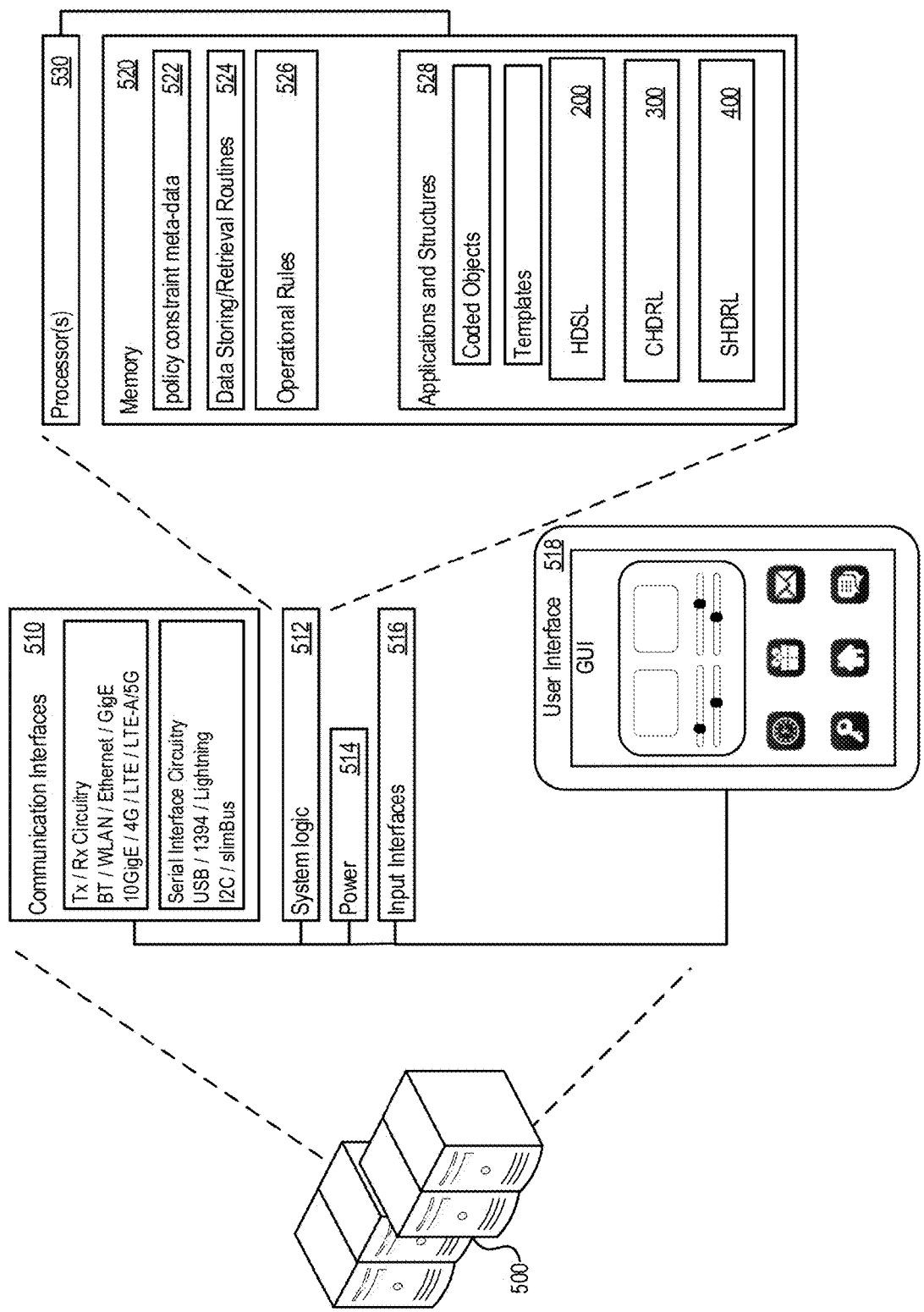
FIG. 5 shows an exemplary specific execution environment for executing the hybrid data storage and normalization logic and the hybrid data retrieval logic.

FIG. 5 shows an exemplary specific execution environment for executing the hybrid data storage and normalization logic 200 and the hybrid data retrieval logic 300/400 on the client/server as described above. The execution environment 500 may server as a portion of the client 102 or the server 104 described above. The execution environment 500 may include system logic 512 to support execution of the logics 200, 300, or 400 described above. The system logic 512 may include processors 530, memory 520, and/or other circuitry.

The memory 520 may include policy constraint meta-data 522, data storing/retrieval routines 524, and operational rules 526. The memory 520 may further include applications and structures 528, for example, coded objects, machine instructions, templates, or other structures to support determining policy constraint meta-data, storing data elements, retrieving data elements, transmitting retrieval requests, or other tasks described above. The applications and structures may implement the HDSL 200, CHDRL 300, and/or SHDRL 400.

The execution environment 500 may also include communication interfaces 510, which may support wireless, e.g. Bluetooth, Wi-Fi, WLAN, cellular (4G, LTE/A, 5G), and/or wired, Ethernet, Gigabit Ethernet, optical networking protocols. The communication interfaces 510 may also include serial interfaces, such as universal serial bus (USB), serial ATA, IEEE 1394, lighting port, I²C, slimBus, or other serial interfaces. The execution environment 500 may include power functions 514 and various input interfaces 516. The execution environment may also include a user interface 518 that may include human-to-machine interface devices and/or graphical user interfaces (GUI). In some implementations, the system logic 512 may be distributed over one or more physical machines or be implemented as one or more virtual machines.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CD-ROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:
1. A method performed by a client comprising:
receiving, with a processor circuitry on the client, a data query for a data entity, the data entity comprising a plurality of data fields each containing a data element, a data field of the plurality of data fields representing an attribute of the data entity, the data element representing a value of the attribute, at least one of the data elements of the plurality of data fields being stored on the client, at least one of the data elements of the plurality of data fields being stored on a server, the client being communicatively connected to the server;
retrieving, with the processor circuitry, policy constraint meta-data for each of the data elements in the data entity, the policy constraint meta-data being generated based on a policy constraint applied to the data elements;

for each of the data elements, determining, with the processor circuitry, whether the data element is stored on the client or the server based on the policy constraint meta-data;

in response to the data element being stored on the client, retrieving, with the processor circuitry, the data element from the client;

in response to the data element being stored on the server, transmitting, with the processor circuitry, a retrieval request for the data element to the server;

receiving, with the processor circuitry, the data element retrieved from the server; and aggregating, with the processor circuitry, the data element retrieved from the client and the data element retrieved from the server as a result of the data query.

2. The method of claim 1, wherein the policy constraint comprising a storage policy constraint and an execution policy constraint, the method further comprises:

generating the policy constraint meta-data for a data element based on the storage policy constraint and the execution policy constraint applied to the data element.

3. The method of claim 2, where the method further comprises:

receiving a retrieval request for a data element in the data entity from the server, the data element being stored on the client;

generating a response to the retrieval request based on the policy constraint meta-data for the data element; and transmitting the response to the server.

4. The method of claim 3, where the generating the response to the retrieval request comprises:

in response to the policy constraint meta-data indicating the data element being non-sharable with the server, generating a null value as the response to the retrieval request.

5. The method of claim 3, where the generating the response to the retrieval request comprises:

in response to the policy constraint meta-data indicating the data element being limitedly sharable with the server, generating relevant information of the data element as the response to the retrieval request.

6. The method of claim 5, where the retrieval request comprising an executable logic generated by the server, and the generating the relevant information of the data element comprises:

executing the executable logic to generate the relevant information of the data element.

7. The method of claim 3, where the generating the response to the retrieval request comprises:

in response to the policy constraint meta-data indicating the data element being sharable with the server, retrieving the data element from the client as the response to the retrieval request.

8. The method of claim 7, where the retrieval request comprising an executable logic generated by the server, and the retrieving the data element from the client comprises:

executing the executable logic to retrieve the data element from the client.

9. The method of claim 8, where the method further comprises:

determining an execution environment for the executable logic based on the policy constraint meta-data indicating the execution policy constraint for the data element;

the executing the executable logic comprises:

executing the executable logic in the execution environment to retrieve the data element from the client.

10. The method of claim 7, where the retrieval request comprises identification information of the data entity, and the retrieving the data element from the client comprises:

retrieving the data element from the client based on the identification information of the data entity.

11. A method performed by a server comprising:

receiving, with a processor circuitry on the server, a data query for a data entity, the data entity comprising a plurality of data fields each containing a data element, a data field of the plurality of data fields representing an attribute of the data entity, the data element representing a value of the attribute, at least one of the data elements of the plurality of data fields being stored on a client, at least one of the data elements of the plurality of data fields being stored on the server, the client being communicatively connected to the server;

retrieving, with the processor circuitry, policy constraint meta-data for each of the data elements in the data entity, the policy constraint meta-data being generated based on a policy constraint applied to the data elements, the policy constraint comprises a storage policy constraint;

for each of the data elements, determining, with the processor circuitry, whether the data element is stored on the client or the server based on the policy constraint meta-data indicating the storage policy constraint;

in response to the data element being stored on the server, retrieving, with the processor circuitry, the data element from the server;

in response to the data element being stored on the client, generating a retrieval request for the data element based on the policy constraint meta-data of the data element;

transmitting, with the processor circuitry, the retrieval request for the data element to the client;

receiving, with the processor circuitry, a response to the retrieval request from the client; and aggregating, with the processor circuitry, the response retrieved from the client and the data element retrieved from the server as a result of the data query.

12. The method of claim 11, where the generating the retrieval request comprises:

generating an executable logic to process the data element; and adding the executable logic to the retrieval request.

13. The method of claim 11, where the policy constraint comprises an execution policy constraint, the method further comprises:

determining an execution environment based on the policy constraint meta-data indicating the execution policy constraint for the data element; and the retrieving the data element from the server comprises:

retrieving the data element from the server in the execution environment.

* * * * *